(12) United States Patent
Falco et al.

(10) Patent No.: US 6,375,361 B1
(45) Date of Patent: Apr. 23, 2002

(54) OPTICAL FIBER CONNECTOR ELECTROMAGNETIC SHIELD ASSEMBLY

(75) Inventors: Wayne R. Falco, Wanamassa; Dany M. Zeidan, Howell, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/642,381

(22) Filed: Aug. 21, 2000

(51) Int. Cl.[7] .................................................. G02B 6/38
(52) U.S. Cl. ...................... 385/53; 439/181; 174/35 MS
(58) Field of Search .......................... 385/53; 174/35 R, 174/35 MS; 361/816, 818; 439/181, 578, 579, 607

(56) References Cited

U.S. PATENT DOCUMENTS 3,264,534 A * 8/1966 Murphy ...................... 165/185
5,012,041 A * 4/1991 Sims et al. ............ 174/35 MS
5,386,345 A * 1/1995 Matsuzaki et al. .......... 361/816
5,591,971 A * 1/1997 Shahar et al. ............... 250/310

OTHER PUBLICATIONS

IBM Technical Disclosure Bulletin vol 39, No. 11 Nov. 1996.*

* cited by examiner

Primary Examiner—Brian Sircus
Assistant Examiner—Michael C. Zarroli
(74) Attorney, Agent, or Firm—David L. Davis

(57) ABSTRACT

An electromagnetic shield assembly for an optical fiber connector which comprises a conductive frame member enclosing an open space and a plurality of conductive fibers each secured at only one end to the frame member and extending into the open space. The free ends of the conductive fibers overlap in a central region of the open space to provide a "self-healing" mesh shield.

6 Claims, 3 Drawing Sheets

OPTICAL FIBER CONNECTOR ELECTROMAGNETIC SHIELD ASSEMBLY

BACKGROUND OF THE INVENTION

This invention relates to the provision of an electromagnetic compliance and electrostatic discharge shield assembly for an optical fiber connector extending through an opening in a conductive faceplate.

Modern electronic systems equipment, such as for telecommunications purposes, often includes various subassemblies packed closely together and interconnected by cabling. Such systems operate at relatively high frequencies and therefore electromagnetic radiation and interference are often a problem. To obviate this problem, the cables often include a conductive outer jacket which provides shielding and grounding for the cable. In addition, the subassemblies are often encased within a conductive housing. While such a housing is somewhat effective, electromagnetic radiation can still pass through gaps in the housing. At the increasingly high frequencies utilized in today's equipment, even a small gap permits unwanted electromagnetic radiation to pass therethrough. In addition, an electrostatic discharge from a person approaching the housing can jump through the gap and damage sensitive electronic components within the housing. One source of such a gap is an optical fiber connector extending through an opening in a faceplate. The optical fiber itself is non-conductive, as are portions of the connector. Accordingly, there exists a need to provide an effective shielding assembly to eliminate the effects of such gaps.

Presently, it is known to provide conductive shielding covers to totally surround electronic equipment. However, such a cover requires the opening and closing of a "door" in order to change connections. It would therefore be desirable to provide a shield assembly which allows an optical fiber and connector to pass therethrough without requiring the use of such a door, while still maintaining the shielding effect.

SUMMARY OF THE INVENTION

According to the present invention, there is provided an electromagnetic shield assembly for an optical fiber connector which comprises a conductive frame member enclosing an open space and a plurality of conductive fibers each secured at only one end to the frame member and extending into the open space. This shield assembly is mountable over an opening in a conductive faceplate and allows an optical fiber connector to be inserted therethrough with a "self-healing" effect which results in the conductive fibers wrapping around the optical fiber to maintain the shielding effect.

In accordance with an aspect of this invention, the frame member is polygonal having a plurality of sides and each conductive fiber is secured to a respective side of the frame member.

DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
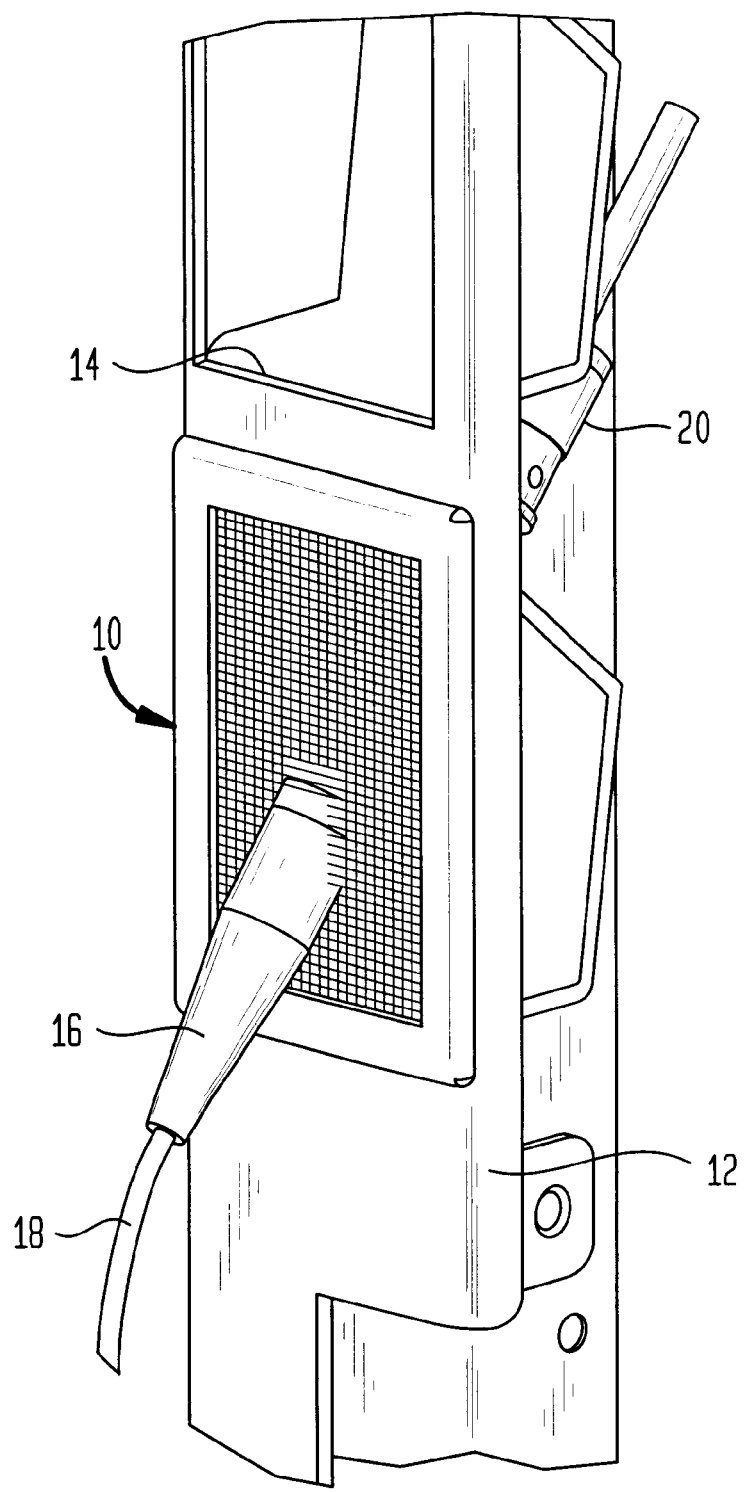
FIG. 1 is a perspective view of a conductive faceplate having mounted thereto an electromagnetic shield assembly constructed in accordance with the principles of this invention, through which an optical fiber connector is inserted.
Figure 2:
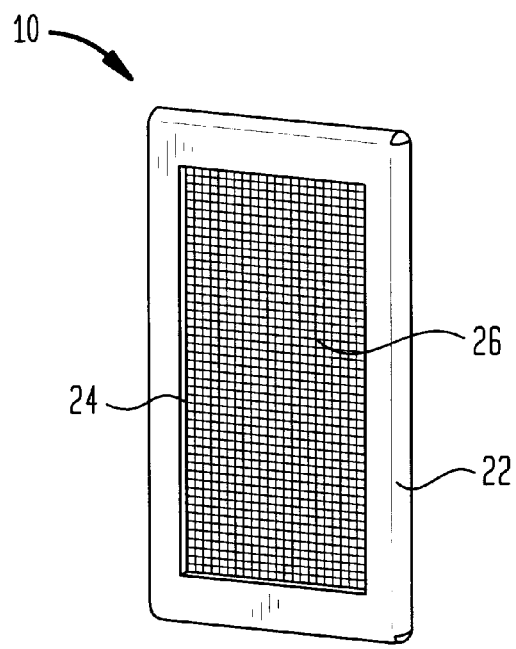
FIG. 2 is a perspective view showing an embodiment of the inventive shield assembly.
Figure 3:
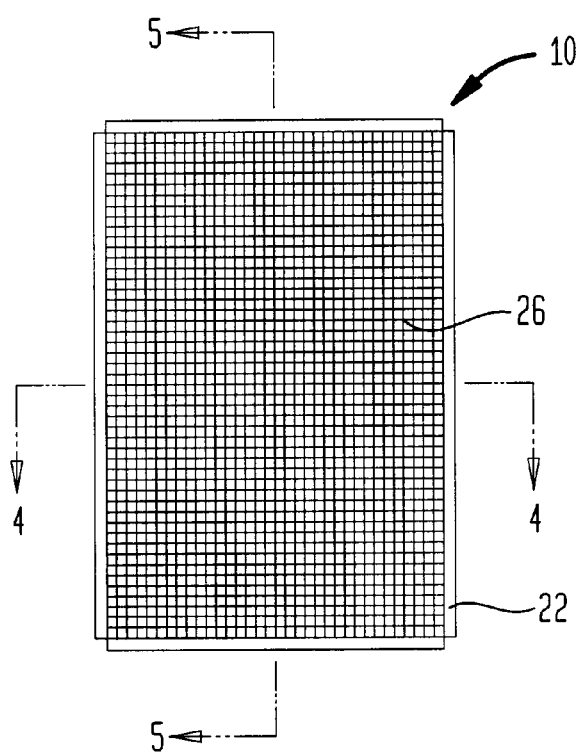
FIG. 3 is a plan view showing an embodiment of the inventive shield assembly.

Referring to the drawings, FIG. 1 shows an embodiment of an electromagnetic shield assembly, designated generally by the reference numeral 10 and constructed in accordance with the principles of this invention, mounted to a conductive faceplate 12 of an electronic system. More particularly, the shield assembly 10 covers an opening of the faceplate 12, identical to the opening 14. The opening is for the purpose of providing access for a connector 16 terminating the end of an optical fiber 18 to interconnect with an optical fiber connector 20 which is part of the electronic system.

Figure 4:
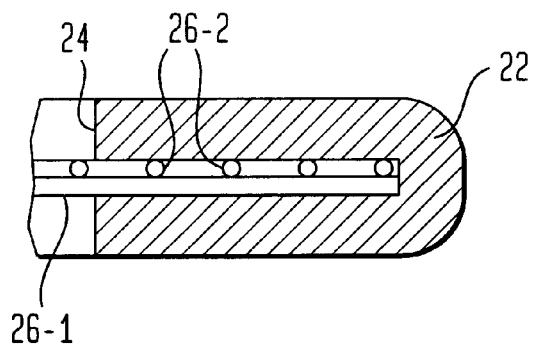
FIG. 4 is an enlarged detail of the frame member taken along the line 4—4.
Figure 5:
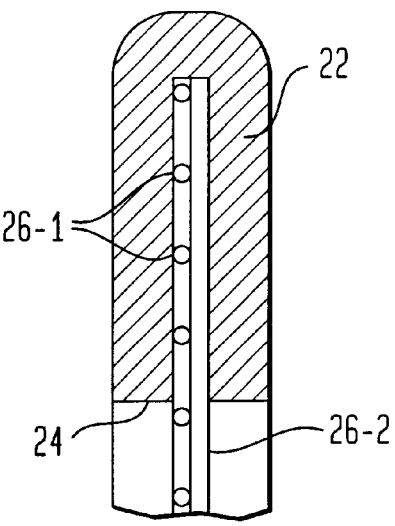
FIG. 5 is an enlarged detail of the frame member taken along the line 5—5.
Figure 6:
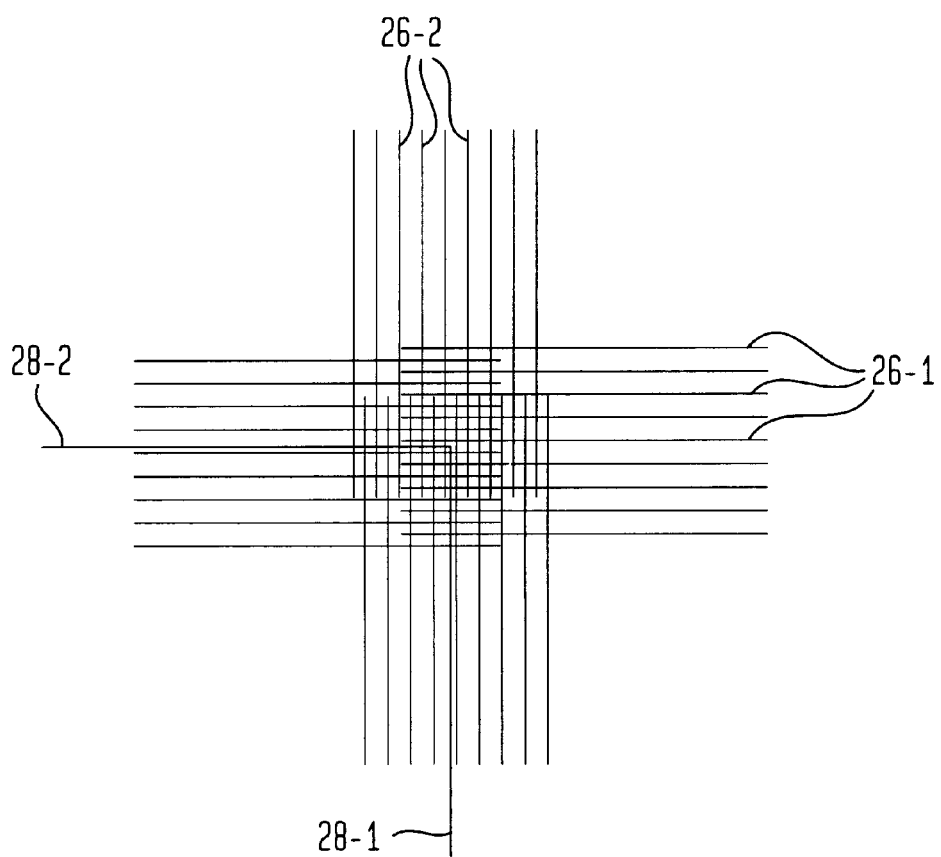
FIG. 6 is an enlarged detail showing the conductive fibers in the central portion of an embodiment of the inventive shield assembly.

As shown in FIGS. 2–5, the shield assembly 10 includes a polygonal conductive frame member 22, illustratively made of sheet aluminum. The frame member 22 is illustratively rectangular and encloses a rectangular open space 24. The shield assembly 10 further includes a plurality of conductive fibers 26, made up of horizontal fibers 26-1 and vertical fibers 26-2. To assemble the shield assembly 10, the frame member 22, in planar sheet form, is placed on a flat surface and the conductive fibers 26 are placed thereon, each with only one end on a respective side of the frame member 22 and extending orthogonally to that side into the open space 24 toward the opposite side to form an orthogonal array of conductive fibers. The free end of each of the fibers 26 extends toward the opposite side and beyond a line which extends midway between each pair of opposed sides, so that the fibers 26 overlap in the middle of the open space 24. This provides ground continuity. Preferably, the fibers 26 are stainless steel filaments of sufficiently small diameter that there are approximately 3600 fibers per linear inch on each side of the frame member 22. The frame member 22 is then folded over and crimped to secure the fibers 26 therebetween, as shown in FIGS. 4 and 5. FIG. 6 illustrates an enlarged view of the central section of the open space 24 showing how the horizontal fibers 26-1 and the vertical fibers 26-2 overlap in that region. Thus, as shown, the free end of each of the horizontal fibers 26-1 extends beyond the vertical line 28-1 which is midway between the vertical sides of the frame member 22, and the free end of each of the vertical fibers 26-2 extends beyond the horizontal line 28-2 which is midway between the horizontal sides of the frame member 22.

In use, the shield assembly 10 is mounted to the faceplate 12 by rivets, screws, sliding within a track, or any other suitable method, so as to cover an opening 14 of the faceplate 12. The connector 16 is then inserted through a central region of the shield assembly 10, with the flexible and elastic nature of the fibers 26 causing them to wrap around the connector 16 in a manner so as to provide a "self-healing" of the hole of penetration. The connector 16 is typically of a conductive nature, so that the only open hole in terms of electromagnetic compliance leakage is the diameter of the optical fiber 18, which is negligible for electromagnetic compliance leakage. The shield assembly 10 thereby provides a shield against electromagnetic leakage and electrostatic discharge for the opening 14 in the faceplate 12.

Accordingly, there has been disclosed an electromagnetic compliance and electrostatic discharge shield assembly for an optical fiber connector extending through an opening in a conductive faceplate. While an illustrative embodiment of the present invention has been disclosed, it is understood that various adaptations and modifications to the disclosed embodiment are possible, and it is therefore intended that this invention be limited only by the scope of the appended claims.

What is claimed is:

1. An electromagnetic shield assembly for an optical fiber connector, comprising:

a conductive frame member enclosing an open space, said conductive frame member being a regular polygon having an even number of sides; and a plurality of conductive fibers each secured at only one end to a respective side of the frame member and extending into the open space toward an opposite side of the frame member and beyond a line which extends midway between the respective side and the opposite side.

2. The shield assembly according to claim 1 wherein the frame member is rectangular.

3. The shield assembly according to claim 1 wherein the conductive fibers secured to each side of the frame member are arranged in a parallel array orthogonal to that side.

4. The shield assembly according to claim 1 wherein the conductive fibers are stainless steel fibers.

5. The shield assembly according to claim 1 wherein the conductive fibers secured to each side of the frame member are arranged in a plane.

6. The shield assembly according to claim 1 wherein there are approximately 3600 conductive fibers per linear inch along each side of the frame member.

* * * * *